United States Patent [19]

Spanlang

[11] Patent Number: 4,774,968
[45] Date of Patent: Oct. 4, 1988

[54] COMBINE HARVESTER
[76] Inventor: Helmut Spanlang, Schatzdorferstr. 13, A-4910 Ried, Austria
[21] Appl. No.: 77,940
[22] Filed: Jul. 27, 1987
[30] Foreign Application Priority Data Jul. 25, 1986 [AT] Austria .................. 2013/86

[51] Int. Cl.⁴ .................. A01F 12/28
[52] U.S. Cl. .................. 130/27.5; 130/27 K
[58] Field of Search ............ 56/14.6; 130/27 R, 27 J, 130/27 K, 27 L, 27 S

[56] References Cited
U.S. PATENT DOCUMENTS 2,616,433 11/1952 Anderson .................. 130/27 S
2,743,728 5/1956 Carlson .................. 130/27 J
2,833,288 5/1958 Scranton .................. 130/27 J

FOREIGN PATENT DOCUMENTS 720503 5/1942 Fed. Rep. of Germany .

Primary Examiner—Stephen F. Husar
Attorney, Agent, or Firm—Kurt Kelman

[57] ABSTRACT

A combine harvester is provided which comprises a housing (1) and a concave (3), which is adjustably mounted in the housing below a threshing drum (2). To permit a simple change of the mesh size of the concave, the concave (3) consists of a frame (9), which is movably mounted in the housing, and a replaceable insert (10), which is adapted to be slidably extracted from and inserted into the frame (9) through a lateral opening (13) of the housing in a direction which is parallel to the axis of the threshing drum (2).

2 Claims, 3 Drawing Sheets

COMBINE HARVESTER

BACKGROUND OF THE INVENTION

1. Field of the Invention

This invention relates to a combine harvester comprising a housing and a concave, which is disposed in the housing below a threshing drum and comprises a frame that is rotatably mounted in the housing and a insert which is detachably mounted in the frame.

2. Description of the Prior Art

For an adaptation of the thresher of a combine harvester to a given crop to be harvested, the speed of the threshing drum and the clearance between the concave and the threshing drum must be adjusted and the mesh size of the concave must also be selected in view of the crop to be harvested. For that purpose the concave must be removed and replaced by a concave having a different mesh size. In known combine harvesters the concave can be removed only with difficulty because it is necessary to remove the shaker and the cleaning sieve before the concave is accessible and said operations involve a substantial working time.

To permit the concave to be replaced without a need for changing the holder for the concave and the means for adjusting the concave, it is known from German Patent Specification No. 720,503 to provide a concave which is composed of a frame that is rotatably mounted in the housing and an insert, which can slidably be inserted into lateral guide rails of the frame in the peripheral direction of the threshing drum, transversely to the axis of the drum, and can be fixed in position by means of set screws. In that case an alteration of the combine harvester requires only the insert rather than the entire concave to be replaced. But even in that case the shaker and the cleaning sieve must also be removed in order to render the concave accessible for a replacement of its insert.

SUMMARY OF THE INVENTION

It is an object of the invention to avoid said disadvantage and so to improve a combine harvester which is of the kind described first hereinbefore that the concave can be altered in a simple manner for an adaptation to the crop to be harvested.

That object is accomplished in accordance with the invention in that the insert of the concave is adapted to be slidably extracted from and inserted into the frame through a lateral opening of the housing in a direction which is parallel to the axis of the threshing drum.

Because the insert is adapted to be slidably extracted from and inserted into the frame in a direction which is parallel to the axis of the threshing drum the insert to be installed in the frame can be moved into the housing through a lateral opening of the housing so that an alteration of the concave can be effected without a need for a removal of other elements of the combine harvester. For this reason the insert of the concave can be replaced within a short working time by another insert having a different mesh size.

To hold the insert in the frame of the concave against a displacement relative to said frame, it is possible within the scope of the invention to provide between the frame and the insert of the concave a clamping wedge for preventing an extraction of the insert from the frame and to provide a screw drive which extends through the housing along the axis of the threshing drum, and to operate said screw drive so as to move the clamping wedge in the clamping sense against the force of a releasing spring. The clamping wedge, which is adjustable by a screw drive, can exert a clamping force in a direction which is transverse to the direction in which the insert is displaceable so that the insert can be clamped in the frame of the concave in a simple manner by means of the axial screw drive. When the screw drive is operated in a releasing sense, the releasing spring acting on the clamping wedge in a releasing sense will cause the insert to be released and during the extraction of the insert will prevent a frictional contact between the clamping wedge and the insert. Besides, the releasing spring may constrain the clamping wedge to move along a predetermined path so that separate means for guiding the clamping wedge are not required.

DETAILED DESCRIPTION OF THE PREFERRED EMBODIMENT

Figure 1:
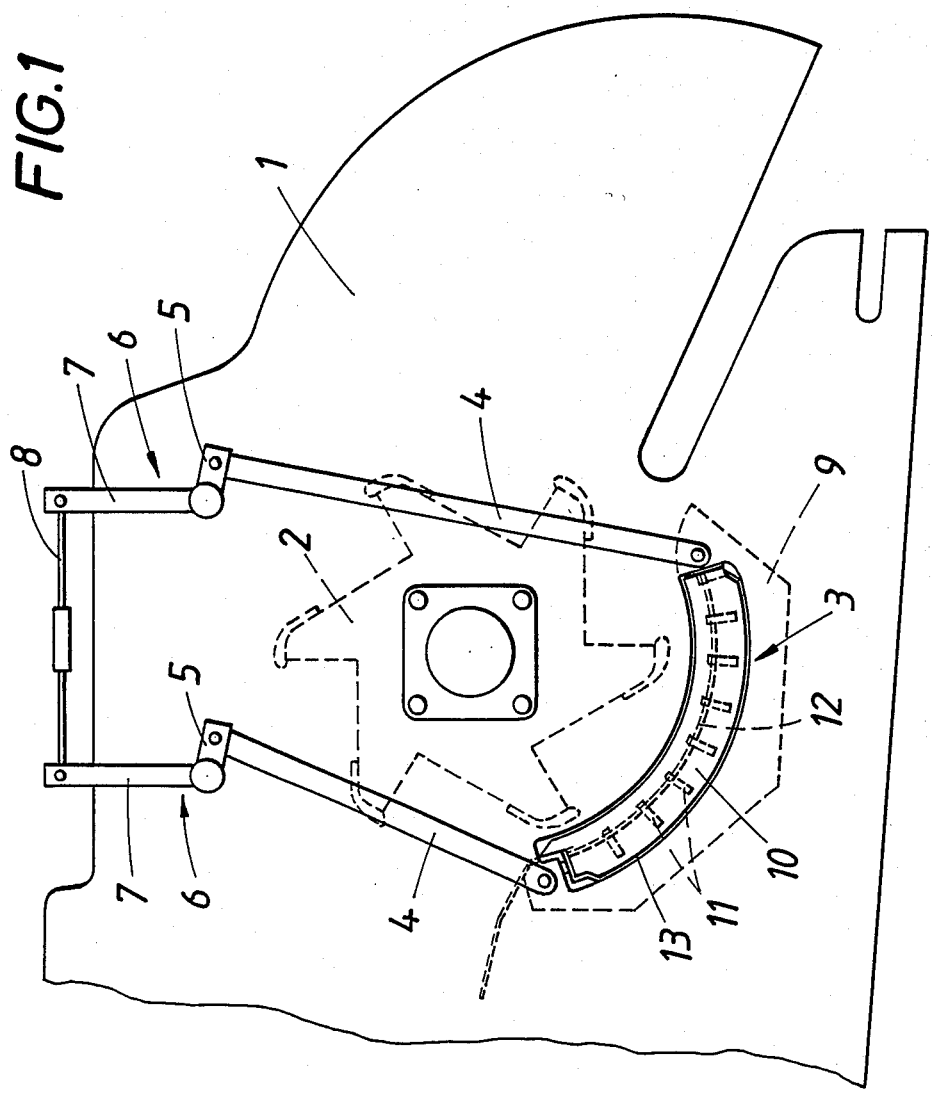
FIG. 1 is a diagrammatic side elevation showing the thresher of a combine harvester in accordance with the invention.
Figure 2:
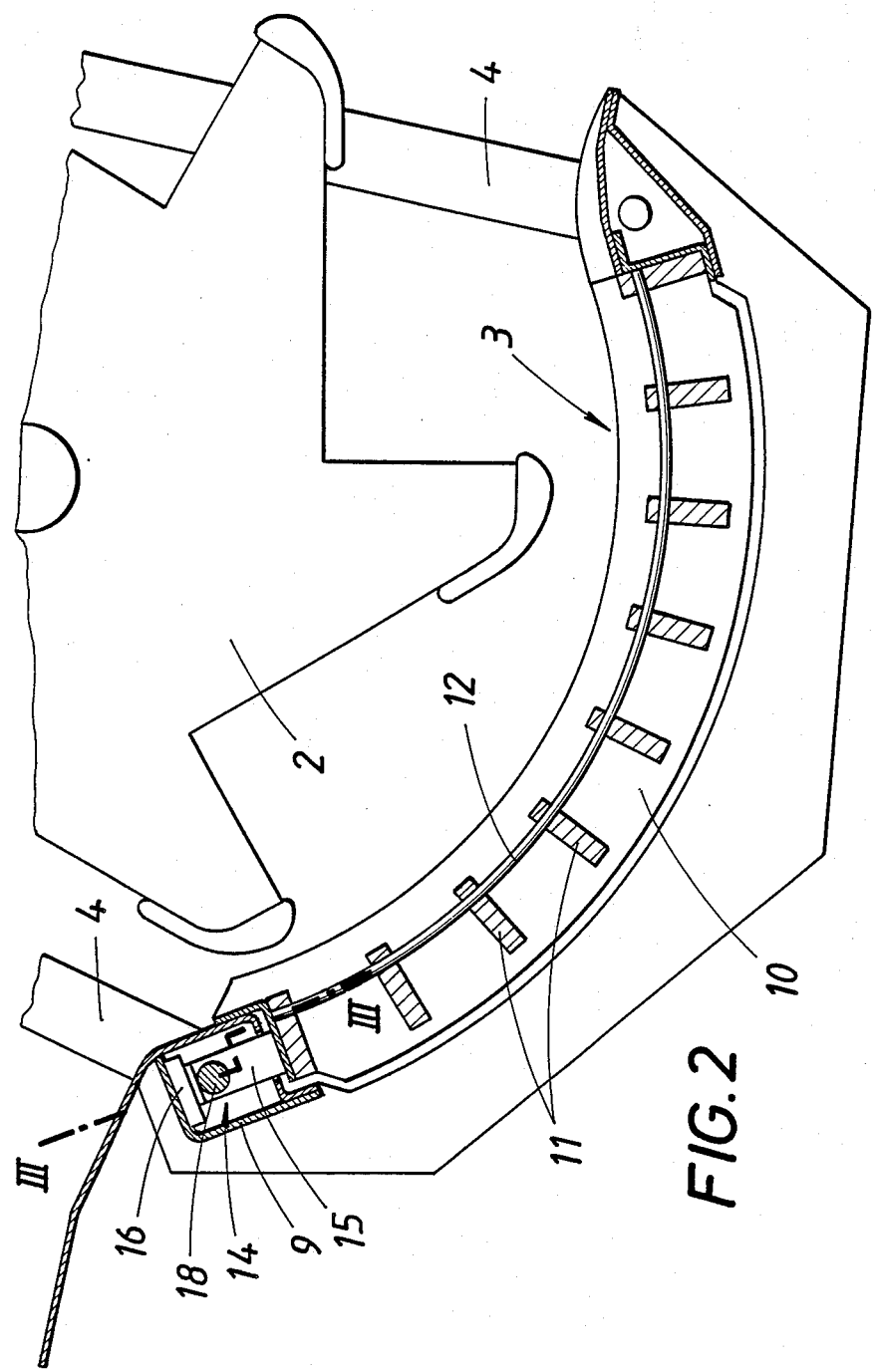
FIG. 2 is a sectional view taken on a plane that is normal to the axis of the concave and shows that thresher on a larger scale.
Figure 3:
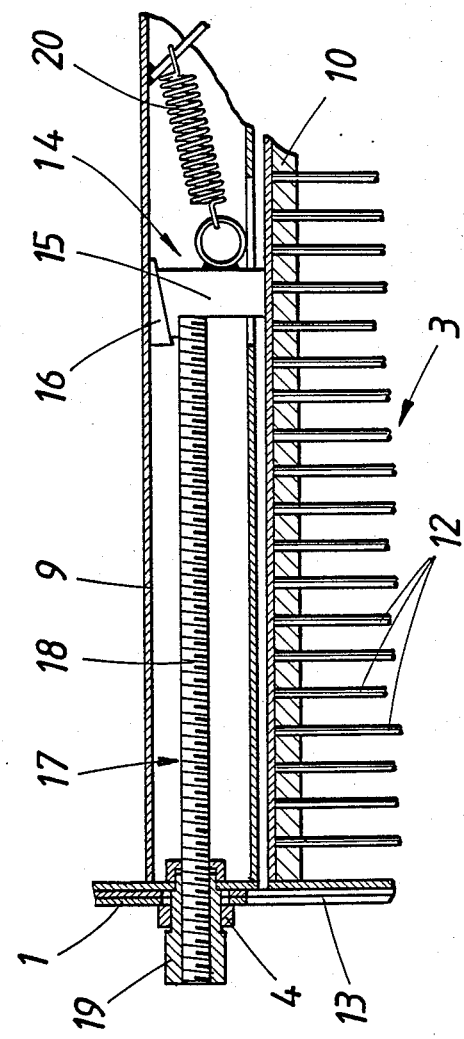
FIG. 3 is a transverse sectional view taken on line III—III in FIG. 2.

An illustrative embodiment of the invention will now be described with reference to the drawing.

Those parts of the combine harvester which do not belong to the thresher are not shown for the sake of clearness. The thresher comprises a housing 1, which is represented by a side wall 1 and in which a threshing drum 2 is mounted for rotation about its axis, which intersects the side wall 1. A concave 3 is disposed below the threshing drum 2 and movably mounted in the housing. The concave 3 can be adjusted to select the clearance between the concave 3 and the threshing drum 2. For this purpose the concave 3 is suspended from lateral links 4, each of which is pivoted to one arm 5 of an associated bellcrank lever 6. By means of said bellcrank levers 6 the links 4 can be adjusted in the same direction or in mutually opposite directions. The arms 7 of the bellcrank levers 6 are interconnected by a coupler 8, which is adjustable in length. A change of the length of the coupler 8 will move the two links 4 in mutually opposite senses. When the two bellcrank levers 6 are pivotally moved in the same sense by means of the coupler 8, the concave 3 will be radially displaced substantially parallel to itself relative to the threshing drum 2.

To permit a simple adaptation of the concave 3 to a given crop to be harvester, the concave 3 comprises a frame 9 and an insert 10. The frame 9 is suspended from the links 4. The insert 10 has slidably been inserted into the frame 9 along the axis of the threshing drum 2. The insert 10 comprises a grid, which consists of transverse bars 11 and longitudinal wires 12. Said bars 11 and said wires 12, respectively, have certain spacings, which are selected to provide a mesh size which is suitable for a given crop to be harvested. For a replacement of the insert 10 it will be suifficient to extract said insert 10 from the frame 9 through an opening 13 in the side wall 1 along the axis of the threshing drum 2 and to slidably insert an insert having a different mesh size into the frame through the opening 13. Because the insert can be extracted and inserted in the axial direction through a opening 13 in the side wall 1 that replacement can be performed without a need for removing other parts of the combine harvester. The structure provided inside the housing is designed to define an unobstructed path for the extraction of the insert 10 from the frame 9 through the opening 13 of the side wall 1 out of the housing.

The insert 10 is held in the frame 9 by a mechanism which prevents an extraction of the insert 10. In the embodiment shown by way of example said mechanism comprise a clamping wedge 15, which is movable in contact with and along a mating wedge 16 that is secured to the frame 9. The clamping wedge 15 is movable by means of a screw drive 17, which comprises a screw 18 that is connected to the clamping wedge 15 and extends parallel to the axis of the threshing drum through the side wall 1 and is screwed through a nut 19 that is rotatably mounted in and axially held by the side wall 1. In response to a rotation of the nut 19 in one sense the screw 19 will force the clamping wedge 15 along the mating wedge 16 against the force of a releasing spring 20 so that the clamping wedge 15 will be forced against the insert 10 to clamp the latter in the frame 9 against a displacement. In case of a rotation of the nut 19 in the opposite sense the releasing spring 20 will return the clamping wedge 15 and will disengage it from the insert 10, which can now freely be extracted out of the frame 9 through the opening 13 of the side wall 1 and can be replaced by an insert having a different mesh size.

I claim:
1. A combine harvester comprising
   a housing having a side wall,
   a threshing drum having an axis intersecting said side wall, the threshing drum being mounted in said housing for rotation about said axis,
   a concave disposed in said housing and comprising a frame adjustably mounted in said housing and an insert detachably mounted in said frame, said side wall being formed with an opening axially aligned with said insert and said insert being adapted to be extracted along said axis from said frame and through said opening out of said housing, and
   locking means for releasably locking said insert in position in said frame, the locking means comprising a clamping wedge extending between said frame and said insert, the clamping wedge being movable along said axis in a first sense to clamp said insert in said frame and in a second sense to release said insert from said frame, a releasing spring opposing the movement of said wedge in said first sense and tending to disengage said wedge from said insert, and a screw drive extending through said side wall and operable from the outside of said housing to move said wedge along said axis.

2. The combine harvester set forth in claim 1, further comprising means disposed in said housing and defining an unobstructed path for the extraction of said insert from said frame through said opening out of said housing.

* * * * *